No. 776,404. PATENTED NOV. 29, 1904.
C. C. KEYSER.
CLUTCH.
APPLICATION FILED APR. 18, 1904.
NO MODEL.
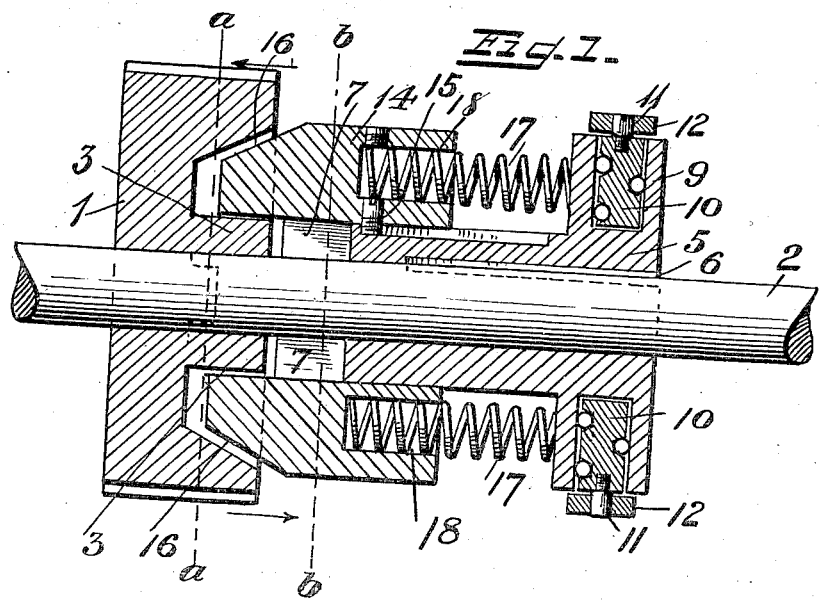
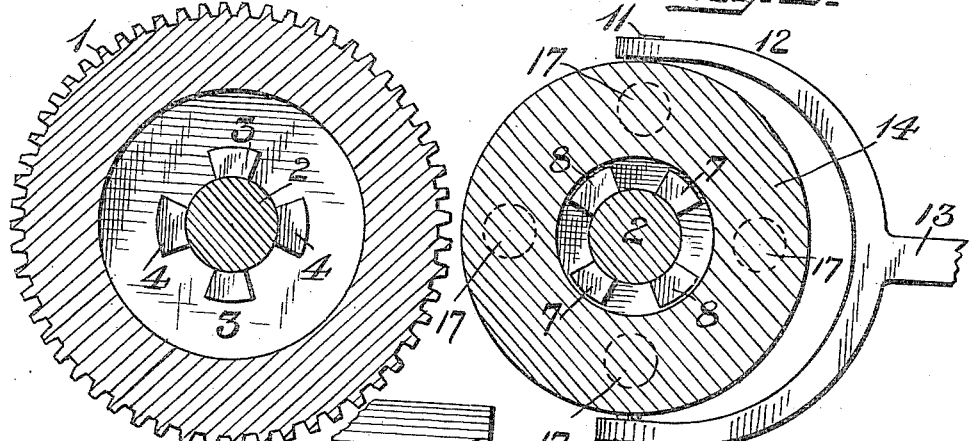
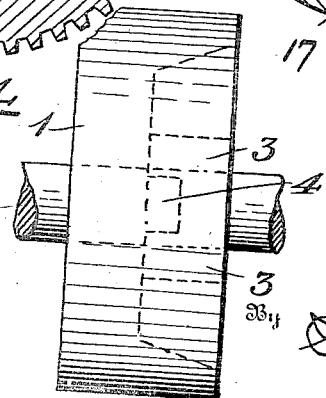
Witnesses
F. L. Ourand.
L. O. Hilton.
Inventor
C. C. Keyser.
By H. B. Willson
Attorney No. 776,404.

Patented November 29, 1904.

UNITED STATES PATENT OFFICE.

CHARLES C. KEYSER, OF NEWPORT NEWS, VIRGINIA.

CLUTCH.

SPECIFICATION forming part of Letters Patent No. 776,404, dated November 29, 1904.

Application filed April 18, 1904. Serial No. 203,659. (No model.)

*To all whom it may concern:*

Be it known that I, CHARLES C. KEYSER, a citizen of the United States, residing at Newport News, in the county of Warwick and State of Virginia, have invented certain new and useful Improvements in Clutches; and I do declare the following to be a full, clear, and exact description of the invention, such as will enable others skilled in the art to which it appertains to make and use the same.

My invention is an improved clutch; and it consists in the construction, combination, and arrangement of devices hereinafter described and claimed.

The object of my invention is to provide a clutch in which there is a driven member and an independently-revoluble driving member having positive interlocking devices in which there is also a primary member for frictionally engaging the driven member yieldingly, so as to obviate the jar and jerk upon the members when the same are clutched.

In the accompanying drawings, Figure 1 is a longitudinal sectional view of a clutch embodying my improvements. Fig. 2 is a transverse sectional view of the same, taken on the plane indicated by the line $a\,a$ of Fig. 1. Fig. 3 is a similar view taken on the plane indicated by the line $b\,b$ of Fig. 1. Fig. 4 is a detail elevation of the driven element, showing the alternate teeth 3 4 in dotted lines.

In the embodiment of my invention here shown the driven member 1, which is revolubly mounted on a shaft 2, is a gear-wheel.
It may be a pulley, a friction-wheel, or of any other suitable construction, and I do not limit myself in this particular. On one side of the driven member, near its center, are clutch-teeth 3, which are equidistant apart, the alternate teeth being shorter than the others, as at 4.

On the shaft 2 is shown a driving member 5, which is feathered or splined thereto, as at 6, so that the driving member is necessarily revolved with the shaft, but is adapted to move longitudinally thereon. The driving member is provided at one end with clutch-teeth 7, which are similar to the clutch-teeth 3 of the driven member and are adapted to engage the same, the alternate clutch-teeth 7 being shorter than the others, as at 8. The driving member is shown as provided at its outer end with an annularly-grooved head 9, in which is a shifting collar 10, the latter being pivotally connected, as at 11, to the arms 12 of a shifting-lever 13, which may be used to move the driving member into and out of engagement with the driven member.

A primary member 14 is here shown as carried by the driving member and splined or feathered thereto, as at 15, so that the primary member is revoluble with the driving member and is movable longitudinally thereon. The primary member and the driven member are provided at their opposing sides with coengaging frictional faces 16, which may be either of the form here shown or of any other suitable form. Springs 17 are employed to move the primary member into yieldable frictional contact with the driven member, so as to frictionally connect the latter to the driving member and cause both of the said members to rotate and at the same rate of speed prior to the engagement of the teeth of the driving member with those of the driven member, and hence prevent the jerk, jar, and stress which would otherwise result upon a sudden engagement of the positively-locking clutch-teeth of the driven and driving members. Springs 17 are here shown as bearing between the head 9 of the driving member and the primary member and with their ends disposed in sockets 18 in the primary member. Within the scope of my invention any suitable number of the springs may be employed, the springs may be of any suitable construction, and they may be supported by any suitable means and caused to press the primary member so as to engage the same with the driven member frictionally by any suitable means. The function of the said springs is to project the friction end of the primary member beyond the engaging side of the driving member, so that when the latter is moved toward the driven member the driven and driving members will be frictionally locked together by the primary member prior to the engagement of the positively-locking teeth of the driven and driving members, as heretofore stated. The position of the mutually-engaging alternately-shortened teeth of the driving and driven members facilitates their coengagement when the said members are moved toward each other, as will be understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a clutch, the combination of a shaft, a driven element revoluble thereon and having a frusto-conical recess in one side forming a friction-surface, a driving element revoluble with and longitudinally movable on the shaft, said driven and driving elements having co-acting clutch-teeth on their opposing sides, a primary member carried by the driven member and connected thereto for rotation therewith and longitudinal movement thereon and having a frusto-conical end forming a friction-surface to engage the corresponding friction-surface of the driven element, and a spring to project the said frusto-conical end of the primary member beyond the clutch-toothed end of the driving member, and means to move the latter, and hence also the primary member, longitudinally on the shaft.

In testimony whereof I have hereunto set my hand in presence of two subscribing witnesses.

CHARLES C. KEYSER.

Witnesses:
T. C. PATTERSON,
E. A. LINDGREN.